United States Patent Office 3,503,964
Patented Mar. 31, 1970

3,503,964
PROCESS FOR THE MANUFACTURE OF ESTERS OF 7-AMINOCEPHALOSPORANIC ACID
Bruno Fechtig, Binningen, Ernst Vischer, Basel, Hans Bickel, Binningen, Rolf Bosshardt, Arlesheim, and Jakob Urech, Basel, Switzerland, assignors to Ciba Corporation, New York, N.Y., a corporation of Delaware
No Drawing. Continuation-in-part of application Ser. No. 346,398, Feb. 21, 1964. This application Nov. 29, 1966, Ser. No. 597,578
Int. Cl. C07d 99/24
U.S. Cl. 260—243                    13 Claims

ABSTRACT OF THE DISCLOSURE

Process for the provision of esters of 7-ACA, which comprises permitting a diester of cephalosporin C whose amino group is free, is allowed to remain for some days diluted in an inert organic solvent immiscible with water in the presence of an acid having a pK-value from 2 to 6, more especially 3 to 5, as catalyst, or without that catalyst.

---

This is a continuation-in-part application of our copending application Ser. No. 346,398, filed Feb. 21, 1964 and now abandoned.

The present invention provides a new process for the manufacture of esters of 7-aminocephalosporanic acid (7-ACA). This acid has the formula

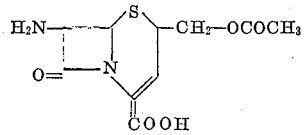

Esters of 7-ACA are useful compounds as they can be transformed into derivatives of cephalosporin C or 7-ACA which have valuable antibacterial activity. Such derivatives are obtained, for instance, by splitting off the ester group and acylating the free 7-ACA, for example by phenylacetyl or by thienylacetyl. Instead of first splitting off the ester group and then acylating, one can also first acylate the 7-ACA ester and then split off the ester group. Further, to obtain active products, 7-ACA can be reacted with an isocyanic acid eser as, for instance, described in U.S. Patent No. 3,264,291.

It is known that the manufacture of 7-ACA esters (or 7-ACA) from cephalosporin C involves considerable difficulty, because the amide group of the β-lactam ring is much more sensitive to hydrolysing agents than the amide group in the 7-position. The hitherto known processes for the manufacture of 7-ACA esters (or 7-ACA) starting from cephalosporin C are unsatisfactory, because the product is obtained in very small yields. Thus, Loder, Newton and Abraham, Biochem. J. 79 (1961), page 408 et seq., have shown that the maximum amount of 7-ACA obtainable by hydrolysis of cephalosporin C with dilute hydrochloric acid is 0.93%. By treating 2.0 g. of cephalosporin C with 50 ml. of 0.2 N hydrochloric acid, Loder et al. obtain 40 mg. of crude 7-ACA (cf. U.S. Patents 3,207,755 and 3,219,662. Example 1 each) from which only 0.006% of pure 7-ACA were isolated after continuous electrophoresis (cf. Loder et al. l.c. page 411).

It has been found that esters of 7-ACA are obtained in good yield when a diester of cephalosporin C whose amino group is free, is allowed to remain for some days diluted in an inert organic solvent immiscible with water in the presence of an acid having a pK-value from 2 to 6, more especially 3 to 5, as catalysts, or without that catalyst.

In the preparation of the 7-ACA ester the ester groups of the starting material are not critical. The only function of the ester is the blocking of the free carboxyl groups of cephalosporin C. For this purpose any ester derived from an alcohol or phenol can be used. Thus, for instance, one can use esters derived from lower alkanols, for instance methanol, ethanol, propanol, n-butanol, tertiary butyl alcohol, or lower alkanols containing in the α-position substituents, for example hydroxy, lower alkoxy, halogen, mercapto, nitro, cyano, sulfoxy, esterified carboxyl, phenyl, lower alkoxyphenyl, nitro-substituted phenyl, for example cyanomethyl alcohol, para-nitrobenzyl alcohol, para-methoxybenzyl alcohol, di - para - methoxyphenyl-methanol, diphenylmethanol, triphenylmethanol; further, one can use the diesters derived from tetrahydropyranol, or from phenol or nitro- or lower alkoxy-substituted phenol, such as para-nitrophenol, 2:4-dinitrophenol or 2:4:6-trinitrophenol.

The 7-ACA ester can be isolated as such; alternatively, the ester group can be spit off to yield free 7-ACA. In the latter case, one uses as starting material preferably cephalosporin C in which the carboxyl groups are protected by easily hydrolysable alcoholic ester protective groups, viz. esters hydrolysable at a pH below 10, in the first place by benzhydryl ester groups, further, for instance, the para-methoxybenzyl ester, or the tetrahydropyranyl ester.

The diesters of cephalosporin C used as starting material are prepared, for example, by blocking the free amino group of cephalosporin C with an amino protecting group, for example an acyl group, such as trifluoroacetyl, tosyl, carbobenzoxy or particularly tertiary butyloxycarbonyl, or by means of trityl or ortho-nitrophenylsulphenyl, then esterifying the carboxyl groups and splitting off the amino protecting group.

As inert solvent for the diester there is used, for example, a chlorinated hydrocarbon, advantageously a chlorinated lower alkane, such as methylene chloride, chloroform, carbon tetrachloride, or also for example benzene, ether, ethyl acetate, nitromethane.

The diester should preferably be used in a strongly diluted form, for example in a concentration of about 0.2 to 1%.

The reaction medium may contain small amounts of water, the concentration of water being preferably less than 1%. In the presence of such small amounts of water the yield of 7-ACA ester is slightly improved.

The reaction can be performed without any catalyst, but advantageously a catalyst is used, said catalyst being an acid (according to the definition of Brönsted) having a pK-value of 2 to 6, preferably 3 to 5. Such acids are for example benzoic acid, α-naphthoic acid, β-naphthoic acid, phthalic acid, nicotinic acid, picolinic acid, salicylic acid, formic acid, acetic acid, propionic acid, butyric acid, isobutyric acid, isovaleric acid, valeric acid, chloracetic acid, bromacetic acid, α- or β-chloropropionic acid, α- or β-bromopropionic acid, malonic acid, succinic acid, lactic acid, citric acid, pyridine hydrochloride, pyridinium acetate, aniline hydrochloride, o- or p-toluidine hydrochloride.

Taking into account the sensitivity of cephalosporin C to heat or to light, the reaction is advantageously carried out at room temperature and in the absence of light.

As a sideproduct ε-amino adipic acid lactam monoester is formed during the reaction. This sideproduct may be easily separated as neutral substance from the basic ester, for example by extraction with an acidic solvent, chromatography or countercurrent distribution.

The following examples illustrate the invention.

EXAMPLE 1

A solution of 100 mg. of unitary cephalosporin C dibenzyl ester in 20 ml. of extremely pure methylene chloride is kept in the dark at 22° C. The intramolecular reaction which takes place is easy to inspect in the infrared spectrum (1 mm. cell).

The intensity of the amide band of the starting material at 5.93 m$\mu$ gradually drops in the course of several days, and beside it a new band of growing intensity develops at 6.00 m$\mu$ (lactam band of one of the fission products, δ-carbobenzoxy-δ-aminovalero lactam).

After 20 days the batch is evaporated under vacuum, the residue is taken up in chloroform+ether 1:3 and successively agitated with 0.1-molar phosphate buffer pH 3.3 and aqueous phosphoric acid of 2% strength. The resulting precipitate is dissolved in chloroform. The two aqueous extracts are separately extracted with ethyl acetate at pH 8.5. The organic phases are dried over magnesium sulfate and evaporated to yield the following residues: 25.9 mg. of extract No. 1 (chloroform+ether 1:3-share) which, as revealed by its infrared spectrum, (bands at 5.73 and 6.00 m$\mu$ in methylene chloride) consists of δ-carbobenzoxy-δ-aminovalero lactam. No stains in the thin-layer chromatogram are obtained with iodine starch reagent and ninhydrin-collidine;

19.3 mg. of extract No. 2 (precipitate soluble in chloroform) which according to its thin-layer chromatogram (see table) and infrared spectrum (bands at 5.61, 5.75 and 6.93 m$\mu$) contains a small amount of starting material and, in addition, by products;

4.3 mg. of extract No. 3 (from share buffer pH 3.3) which according to its thin-layer chromatogram (see table) contains a small amount of starting material;

26.8 mg. (=44% of the theoretical yield) of 7-aminocephalosporanic acid benzyl ester in extract No. 4 (from 2% phosphoric acid share). Infrared spectrum in methylene chloride bands at 5.62 and 5.75 m$\mu$. According to its thin-layer chromatogram (see table) the product is unitary; it can be hydrogenated in glacial acetic and in the presence of palladium carbon (10% Pd) to yield 7-aminocephalosporanic acid.

The cephalosporin C-dibenzyl ester used as starting material may be prepared as follows:

A solution of 9.43 grams (20 mmols) of cephalosporin C in 250 cc. of N-sodium bicarbonate is mixed with a solution of 3.62 cc. (26 mmols) of tertiary butyloxycarbonyl azide in 150 cc. of dioxane and the mixture is stirred for 5 hours at 40% C. The solution is then concentrated to about 150 cc. at 30° C. under 0.5 mm. Hg, diluted with 200 cc. of water and repeatedly extracted with ethyl acetate. The aqueous phase is saturated with sodium chloride and then exhaustively extracted with cold ethyl acetate at pH 2.0. The extract is washed with saturated sodium chloride solution, dried over sodium sulfate and evaporated under vacuum, to yield amorphous, colorless N-tertiary butyloxycarbonyl-cephalosporin C.

185 cc. of ethereal phenyldiazomethane solution, containing 16 millimols of reagent, are added dropwise in the course of 5 minutes to a solution of 3.2 grams (6.15 millimols) of N-t-butyloxycarbonyl-cephalosporin C in 64 cc. of absolute ethyleneglycol dimethyl ether, and the whole is stirred for 40 minutes at 25° C. in the dark. Any excess reagent is then destroyed by the addition of 2 cc. of glacial acetic acid, stirring being continued for 30 minutes in the dark. The reaction solution is evaporated in vacuo, the residue taken up in 120 cc. of methylene chloride, washed twice with 60 cc. of ice-cold N-sodium bicarbonate solution and then twice with 50 cc. of sodium chloride solution of 10% strength. The aqueous phases are each extracted twice with 40 cc. of methylene chloride. The methylene chloride solutions are dried with sodium sulfate and evaporated in vacuo to yield 6.17 grams of amorphous, partially oily residue which is chromatographed on twenty times its weight of silica gel (deactivated with 5 percent by weight of water). With a mixture of methylene chloride and acetone (95:5) 2.75 grams of N-t-butyloxycarbonyl-cephalosporin C-dibenzyl ester are eluted which is recrystallized from a mixture of acetone, ether and petroleum ether (boiling point 50–70° C.). Melting point: 88.5–91° C.

Infrared absorption spectrum in Nujol: bands inter alia at 2.98$\mu$, 5.61$\mu$, 5.78$\mu$ (with shoulder at 5.70$\mu$), 5.91$\mu$, 6.05$\mu$, 6.57$\mu$, 6.83$\mu$, 7.24$\mu$, 7.69$\mu$, 8.02$\mu$, 8.17$\mu$, 8.55$\mu$, 8.99$\mu$, 9.32$\mu$, 9.53$\mu$, 9.75$\mu$, 10.37$\mu$, 11.0$\mu$, 11.53$\mu$, 13.37$\mu$ and 14.40$\mu$. Ultra-violet absorption spectrum in rectified spirit: $\lambda_{max}$ 265 m$\mu$, ($\epsilon$=8200). $R_f$ value in the thin-layer chromatogram on silica gel (system benzene+acetone 8:2): 0.46. Reaction according to Reindel and Hoppe [Ber. 87, 1103 (1954)]: yellow with violet halo.

Reaction with iodine+starch+acetic acid: positive. [R. Thomas, Nature 191, 1161 (1961): P. H. A. Sneath and Z. F. Collins, Biochem. J. 79, 512 (1961)]:

140 mg. of N-t-butyloxy-carbonyl-cephalosporin C dibenzyl ester (0.2 millimol) are allowed to stand for 5 minutes at 25° C. with 2 cc. of trifluoracetic acid. The trifluoracetic acid is then removed in vacuo. The oily residue is taken up in 20 cc. of methylene chloride, then washed twice with 10 cc. of ice-cold N-sodium carbonate solution, then twice with 10 cc. of sodium chloride solution of 10% strength. The aqueous phases are extracted twice with 5 cc. of methylene chloride. The methylene chloride solutions are dried with sodium sulfate, evaporated in vacuo to yield 120 mg. of cephalosporin C dibenzyl ester which displays the following $R_f$ values in the thin-layer chromatogram:

| System | $R_f$ |
|---|---|
| Dioxane+water (9:1) | 0.77 |
| Benzene+acetone (1:1) | 0.29 |
| Chloroform+methanol (9:1) | 0.56 |
| tert. butanol+isopropanol+water (100:40:55) | 0.62 |
| n-butanol+acetic acid+water (100:100:saturated) | 0.57 |

Reaction with iodine+starch+acetic acid: positive;
Reaction according to Reindel and Hoppe: yellow;
Reaction with ninhydrin+collidine: cherry red.

TABLE.—$R_f$ VALUES IN THE THIN-LAYER CHROMATOGRAM ON SILICA GEL

| System: | Starting material | Extract No. 2 | Extract No. 3 | Extract No. 4 |
|---|---|---|---|---|
| n-Butanol plus acetic acid 10:1 saturated with water | 0.60 | (0.61) 0.80–0.95 | 0.61 (0.47) 0.36 | 0.67 |
| Benzene plus acetone 6:4 | 0.16 | 0.0–0.22 | 0.15 0.0 | 0.62 |
| Indicator, Ninhydrin plus collidine | Red violet | Flesh colored | Red violet | Dark yellow. |
| Iodine starch | Positive | Positive | Positive | Positive. |

The $R_f$ value in the paper chromatogram in the system I (n-butanol+acetic acid (10:1) saturated with water): 0.80; in the system II (water-saturated n-butanol+1% glacial acetic acid): 0.51 bioautographic identification with *Staphylococcus aureus*.

The reagent was prepared as described by R. Thomas in Nature 191, page 1161 [1961]. Weak stains are shown in parentheses.

EXAMPLE 2

2.61 grams of cephalosporin C di-benzyl ester are dissolved in 520 ml. of methylene chloride, treated with 5.2 ml. of an equimolecular mixture of pyridine and glacial acetic acid and allowed to stand in the dark for 4 days at 22° C. The batch is worked up as described in Example 1 to yield the following extracts:

945 mg. of extract No. 1 (chloroform+ether 1:3 share) consisting of δ-carbobenzoxy-δ-aminovalero lactam.

680 mg. of extract No. 2 (precipitate soluble in chloroform).

136 mg. of extract No. 3 (from share buffer 3.3) consisting of cephalosporin C-dibenzyl ester.

604 mg. (38% of the theoretical yield) of unitary 7-amino-cephalosporanic acid benzyl ester in extract No. 4 (from 2% phosphoric acid share).

The identification of all the products is carried out as described in Example 1 by means of infrared absorption spectrum and thin-layer chromatogram (cf. table).

EXAMPLE 3

100 mg of cephalosporin C-dibenzyl ester are dissolved in 20 ml. of methylene chloride, treated with 0.02 ml. of an equimolecular mixture of pyridine and glacial acetic acid, and with 0.02 ml. of water, and the mixture kept in the dark at 22° C. for 7½ days.

Working up in a manner analogous to that of Example 1 yields the following extracts:

46.2 mg. of extract No. 1
15.5 mg. of extract No. 2
9.5 mg. of extract No. 3
32.1 mg. of extract No. 4, this latter extract consisting of unitary 7-amino-cephalosporanic acid-benzyl ester. Yield: 53% of theory.

EXAMPLE 4

100 mg. of cephalosporin C-dibenzyl ester, dissolved in 20 ml. of methylene chloride, are treated with 0.02 ml. of 2 N acetic acid and the mixture kept at 22° C. for 7½ days. Working up according to Example 1 yields 42.8 mg. of extract No. 1
20.0 mg. of extract No. 2
15.2 mg. of extract No. 3, and
30.9 mg. (=51% of theory) of 7-amino-cephalosporanic acid-benzyl ester in extract No. 4.

EXAMPLE 5

In an analogous manner to that described in Examples 1 to 4, cephalosporin C-dimethyl ester, cephalosporin C-diethyl ester and cephalosporin C-di-n-butyl ester are treated to yield 7-aminocephalosporanic acid methyl ester, 7-aminocephalosporanic acid ethyl ester and 7-aminocephalosporanic acid ethyl ester an 7-aminocephalosporanic acid n-butyl ester respectively. The latter have the following $R_f$ values in the paper chromatogram, system I (n-butanol+acetic acid 10:1, saturated with water): methyl ester: $R_f$ I=0.13; ethyl ester: $R_f$ I=0.15; n-butyl ester: $R_f$ I=0.16; yellow-brown coloration with ninhydrin+collidine or bioautographic identification with Staph. aureus after being sprinkled with 1-molar pyridine in acetone+water (1:1) and 1% phenylacetyl chloride in acetone. The ultraviolet spectrum shows a maximum at 263 m$\mu$ ($\epsilon$=8000)

The diesters used as starting materials may be prepared as follows:

1 g. of N-tertiary butyloxycarbonyl-cephalosporin C is dissolved in 20 ml. of methanol, cooled to 0° C. and treated with 15 ml. of an ethereal solution of diazomethane of 4% strength (or diazoethane or diazobutane solution respectively) while being rotated. After about 5 seconds the reaction is stopped by the addition of 3 ml. of glacial acetic acid. The reaction mixture is highly concentrated in vacuo, then taken up in 200 ml. of ethyl acetate, washed with N-sodium bicarbonate and saturated sodium chloride solution, dried over sodium sulfate and evaporated in vacuo to yield N-tertiary butyloxycarbonyl-cephalosporin C-dimethyl ester (or diethyl or dibutyl ester respectively) as an amorphous colorless residue.

The $R_f$ values of the compounds in the system I (n-butanol+acetic acid (10:1), saturated with water) and system III (n-butanol, saturated with water+1% glacial acetic acid) respectively are: dimethyl ester: $R_f$ I=0.89; $R_f$ III=0.84; diethyl ester: $R_f$ I=0.91; dibutyl ester: $R_f$ III=0.70 (bioautographic identification with Staph. aureus).

The tertiary butyloxycarbonyl group is split off by means of trifluoroacetic acid as described in Example 1.

EXAMPLE 6

When cephalosporin C-di-para-nitrophenyl ester is hydrolyzed, as described in Examples 1 to 4, 7-aminocephalosporanic acid para-nitro-phenyl ester is obtained. The compound migrates in paper electrophoresis (pH 4.5; 2000 volts, 1½ hours) 8.2 cm. in the direction of the cathode.

The cephalosporin C-di-para-nitrophenyl ester used as starting material may be prepared as follows:

6.47 g. of tertiary butyloxycarbonylcephalosporin C, 4.24 g. of para-nitrophenol and 8.56 g. of dicyclohexylcarbodiimide are dissolved in 300 ml. of acetonitrile and allowed to stand in the dark for 17 hours at 22° C. in a nitrogen atmosphere. The precipitated dicyclohexylurea (4.38 g.) is filtered off and evaporated in vacuo. The evaporation residue is triturated three times with 100 ml. of petroleum ether each time to separate the excess dicyclohexyl carbodiimide (2.94 g.) and the insoluble product is filtered off. The material is dissolved in acetone, further dicyclohexylurea (0.19 g.) being separated off. The filtrate is evaporated, the residue taken up in chloroform and exhaustively extracted with 0.5-molar phosphate buffer pH 7.0, washed with saturated sodium chloride solution, dried over sodium sulfate and the organic phase evaporated to yield 9.92 g. of crude tertiary butyloxycarbonyl-cephalosporin C-di-para-nitrophenyl ester; when recrystallized from a mixture of chloroform and ether (1:4) the product is in the form of yellowish crystals. According to the thin-layer chromatogram on silica gel the product is unitary. The $R_f$ value in the system chloroform+methanol (95:5) is 0.79, in cyclohexane:ethyl acetate (1:1) 0.19. Yellow spots are obtained with sodium hydroxide solution and colorless spots with iodine starch reagent. The tertiary butyloxycarbonyl group is split off with trifluoroacetic acid as described in Example 1.

EXAMPLE 7

12.6 g. of cephalosporin C-dibenzhydryl ester are dissolved in 2 liter of absolute methylene chloride, treated with 2 ml. of 2 N aqueous acetic acid and allowed to stand for 8 days at 22° C. in the dark. The reaction mixture is evaporated in vacuo and the residue taken up in a mixture of 5 parts of toluene, 2 parts of ethyl acetate, 3 parts of alcohol and 3 parts of 2 N aqueous hydrochloric acid. On being agitated vigorously, the reaction mixture dissolves completely and the phases are separated; the lower phase is extracted with two further upper phases (5 parts of toluene and 2 parts of ethyl acetate). The 3 upper phases are extracted again four times with a mixture of alcohol and 2 N-hydrochloric acid (1:1). The lower phases containing the product are combined, adjusted to pH 6 with aqueous potassium triphosphate solution of 50% strength and freed from alcohol in vacuo. The pH value is then adjusted to 8 with the potassium triphosphate solution and the reaction solution extracted three times with ethyl acetate. The extract is dried over sodium sulfate and evaporated in vacuo to yield the 7-aminocephalosporanic acid benzhydryl ester, which crystallizes from ether in the form of needles combined in clusters of M.P. 122–124° C., and in the thin-layer chromatogram on silica gel in the system n-butanol+glacial acetic acid (10:1) saturated with water displays an $R_f$ value of 0.64 (dirty yellow spot with ninhydrin+collidine).

For the conversion of the ester into the free 7-aminocephalosporanic acid, 6.8 g.=1 part of the ester is dissolved in 1 part of anisole and the solution treated with 5 ml. of trifluoroacetic acid. The reaction mixture is then evaporated immediately in the course of 20 minutes under 0.2 mm. mercury column, the residue is taken up in 30 ml. of ethyl acetate and the solution poured simultaneosly with about 13 ml. of aqueous potassium triphosphate solution of 50% strength on to 20 ml. of aqueous potassium hydrogen phosphate solution of 3% strength while stirring. The two runnings should be adjusted in such a way that the pH value oscillates between 6 and 8 and remains at 7 at the end. The separated aqueous phase is washed twice with 10 ml. of ethyl acetate each time and the three ethylacetate phases with 5 ml. of aqueous potassium hydrogen phosphate solution of 3% strength each time. The organic phases are discarded, the aqueous phases are combined and the pH value adjusted to 3.5 with about 4 ml. of concentrated hydrochloric acid. The product which separates after the reaction mixture has been allowed to stand for 15 hours at 0° C. is filtered off, washed with a little ice-water and dried to yield 3.90 g. (=92% of the theoretical yield) of pure 7-aminocephalosporanic acid.

EXAMPLE 8

4.73 g. (7 millimols) of the sodium salt of cephalosporin C of 71% strength (ultraviolet spectrum in water: $\lambda_{max}$. 260 $\mu$m., $\epsilon$=6000) are dissolved in 80 ml. of methanol, treated with 16.7 ml. of 1.5 N-methanolic hydrochloric acid and after complete dissolution evaporated immediately in vacuo. The residue (5.83 g., containing cephalosporin C hydrochloride) is dissolved in 100 ml. of dimethylformamide and esterified at room temperature for ½ hour with 25 ml. of a solution of 30 millimols of diphenyldiazomethane in petroleum ether. The solvent is evaporated, the residue dissolved in 20 ml. of methylene chloride, stirred with 300 ml. of petroleum ether and the precipitated product filtered. This procedure is repeated twice. The crude product is finally dissolved in methylene chloride and washed three times with an aqueous solution of dipotassium hydrogen phosphate of 10% strength. The organic phase is dried over sodium sulphate and evaporated in vacuo to yield 8.06 g. of cephalosporin C dibenzhydryl ester of about 82% strength. This material is dissolved in 1.5 liters of absolute methylene chloride and, after the addition of 2.4 ml. of glacial acetic acid allowed to stand for 10 days at room temperature. The solvent is evaporated and the residue dissolved in 200 ml. each of the upper and lower phase of a mixture of 600 ml. of toluene, 240 ml. of ethyl acetate, 360 ml. of alcohol and 360 ml. of 2 N-aqueous hydrochloric acid. The phases are separated and extracted twice with 200 ml. of upper phase each time or four times with 100 ml. of lower phase each time. The combined lower phases are adjusted to pH 6.0 with about 160 ml. of aqueous potassium phosphate solution of 50% strength and freed from organic solvent in vacuo. By the addition of a further 110 ml. of potassium phosphate solution the pH value is adjusted to 8.0 and the solution extracted three times with ethyl acetate. The extract is dried over sodium sulphate and evaporated in vacuo to yield 0.90 g. of crude 7-aminocephalosporanic acid benzylhydryl ester. The product is then dissolved in 5 ml. of anisole, treated with 14 ml. of trifluoracetic acid and allowed to stand for 30 minutes at room temperature. A solution, cooled to −10° C., and 180 ml. of methanol and 24 ml. of triethylamine is then added, the batch is rapidly shaken and the pH value adjusted to 3.5 by the addition of a further 1.5 ml. of triethylamine (measured in specimens of 0.15 ml. of reaction solution and 1.5 ml. of water). The batch is allowed to crystallize for 17 hours at −10° C., is filtered and washed with methanol, methylene chloride and ether to yield 177 mg. (=9.3% of the theoretical yield calculated on the cephalosporin C used as starting material) of crystalline 7-aminocephalosporanic acid. The ultraviolet absorption spectrum in 0.1 N-sodium bicarbonate solution displays a maximum at 261 $\mu$m. ($\epsilon$=7700).

EXAMPLE 9

A solution of 0.02 mmol of cephalosporin C dibenzhydryl ester (15 mg.) in 3 ml. of methylenechloride containing 0.005 mmol of glacial acetic acid is allowed to remain at 22° C. for 11 days. After this time the solution is subjected to thin layer chromatography on silica gel. The 7-aminocephalosporanic acid benzhydryl ester has an $R_f$-value of 0.27 in the system toluene-ethyl acetate (1:1) developed with ninhydrin-collidine (yellow stain). By means of comparison with a solution of 7-ACA-benzhydryl ester of known concentration the amount of the ester is determined approximately. There are obtained about 10% of the ester as compared with the reference substance. If instead of glacial acetic acid chloracetic acid is used as catalyst the amount of 7-ACA-benzhydryl ester is about 13%; with benzoic acid as catalyst about 16%. No 7-amino-cephalosporanic acid is obtained when 0.005 mmol of hydrochloric acid or 0.00167 mmol of phosphoric acid is used as catalyst. With pyridine hydrochloride as catalyst about the same amount of 7-ACA-benzhydryl ester as with acetic acid is obtained. Under the same conditions no 7-ACA-ester is formed in the absence of any catalyst.

EXAMPLE 10

When cephalosporin C dibenzhydryl ester is treated in the same way as described in Example 9, but with the addition of 0.03 ml. of water to the reaction medium in each case, the result is qualitatively the same. The intensity of the stains is, however, a little greater.

EXAMPLE 11

When cephalosporin C dibenzhydryl ester is treated in the same way as described in Example 9, but with dioxane as solvent (instead of methylene chloride) no 7-ACA-benzhydryl ester is formed.

EXAMPLE 12

5.24 g. of 70% cephalosporin C-dibenzhydryl ester (4.9 mmol) and 250 mg. of benzoic acid are dissolved in 1 liter of methylene chloride saturated with water, and the solution allowed to stand at room temperature for 11 days. Working up analogous to Example 8 yields 950 mg. of crude 7-aminocephalosporanic acid benzhydryl ester which is split in the manner described in Example 8 to form 7-aminocephalosporanic acid. The yield is 197 mg. (15% of the theory) of crystalline 7-ACA. The UV absorption spectrum in 0.1 N-sodium bicarbonate solution shows a maximum at 261 m$\mu$, $\epsilon$=7900.

What is claimed is:

1. A process for the manufacture of an ester of 7-amino-cephalosporanic acid, wherein a diester of cephalosporin C derived from an alcohol selected from the group consisting of a lower alkanol; a lower alkanol substituted by a member selected from the group consisting of hydroxy, lower alkoxy, halogen, mercapto, nitro, cyano, sulfoxy, carbo-lower alkoxy, phenyl and phenyl substituted by a member selected from the group consisting of lower alkoxy and nitro; phenol; phenol substituted by a member selected from the group consisting of lower alkoxy and nitro; and tetrahydropyranol, whose amino group is free, is allowed to remain for some days in an inert organic solvent immiscible with water in the presence of an acid having a pK-value from 2 to 6 as catalyst, or without such catalyst, and the 7-amino-cephalosporanic acid ester isolated.

2. A process as claimed in claim 1, wherein the cephalosporin C-dibenzhydryl ester is used as starting material.

3. A process as claimed in claim 1, wherein a solution is used in which the cephalosporin C diester is contained in a concentration of about 0.2 to 1%.

4. A process as claimed in claim 1, wherein the solution is allowed to stand at room temperature.

5. A process as claimed in claim 1, wherein a chlorinated hydrocarbon is used as inert solvent.

6. A process as claimed in claim 1, wherein a chlorinated lower alkane is used as inert solvent.

7. A process as claimed in claim 1, wherein methylene chloride is used as inert solvent.

8. A process as claimed in claim 1, wherein the diester is allowed to stand from 3 to 20 days.

9. A process as claimed in claim 1, wherein the reaction is carried out in the presence of acetic acid as catalyst.

10. A process as claimed in claim 1, wherein the reaction is carried out in the presence of pyridinium-acetate.

11. A process as claimed in claim 1, wherein the reaction is carried out in the presence of benzoic acid.

12. A process as claimed in claim 1, wherein the reaction is carried out in the presence of chloracetic acid.

13. A process as claimed in claim 2, wherein the resulting 7-amino-cephalosporanic acid benzhydryl ester is converted into free 7-amino-cephalosporanic acid by means of trifluoracetic acid in the presence of anisol.

References Cited

UNITED STATES PATENTS

| | | |
|---|---|---|
| 3,173,916 | 3/1965 | Schull et al. |
| 3,207,755 | 9/1965 | Abraham et al. |
| 3,218,318 | 11/1965 | Flynn. |
| 3,219,662 | 11/1965 | Abraham et al. |

NICHOLAS S. RIZZO, Primary Examiner